(12) United States Patent
Ebi et al.

(10) Patent No.: US 7,635,535 B2
(45) Date of Patent: Dec. 22, 2009

(54) BATTERY PACK COMPRISING A BATTERY AND A TERMINAL UNIT

(75) Inventors: Ryuichiro Ebi, Osaka (JP); Kenjin Masumoto, Nishinomiya (JP); Toshiharu Kitagawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 10/544,767

(22) PCT Filed: Mar. 31, 2004

(86) PCT No.: PCT/JP2004/004609

§ 371 (c)(1),
(2), (4) Date: Aug. 8, 2005

(87) PCT Pub. No.: WO2005/001962

PCT Pub. Date: Jun. 1, 2005

(65) Prior Publication Data

US 2006/0228623 A1   Oct. 12, 2006

(30) Foreign Application Priority Data

Jun. 26, 2003  (JP) .............................. 2003-182264

(51) Int. Cl.
*H01M 2/06* (2006.01)
*H01M 2/20* (2006.01)
*H01M 2/30* (2006.01)

(52) U.S. Cl. .............................. 429/96; 429/1; 429/65; 429/121; 429/177

(58) Field of Classification Search .................. 429/96, 429/1, 65, 121, 177
See application file for complete search history.

(56) References Cited

U.S. PATENT DOCUMENTS 5,770,328 A   6/1998   Friedli et al.
6,524,732 B1 *  2/2003  Iwaizono et al. ................ 429/7
6,610,438 B2 *  8/2003  Okumura et al. .............. 429/61
6,855,454 B2 *  2/2005  Ray et al. ...................... 429/54

(Continued)

FOREIGN PATENT DOCUMENTS

JP          6-333547          12/1994

(Continued)

OTHER PUBLICATIONS

English Language Abstract of JP 6-333547.
English Language Abstract of JP 2002-231201.
English Language Abstract of JP 2003-242947.

(Continued)

*Primary Examiner*—Tracy Dove
(74) *Attorney, Agent, or Firm*—Greenblum & Bernstein, P.L.C.

(57) ABSTRACT

A battery pack having a battery in which a battery case and a cap of a sealing plate sealing an open end of the battery case serve as connection electrodes of opposite polarities, a terminal unit including external connection terminals respectively connected to these connection electrodes and an insulating cover integrally formed therewith, the terminal unit covering at least one end of the battery case, and a resilient member interposed between one end of the battery case and the terminal unit in a compressed state. In the manufacturing method of this battery pack, the dimension between the terminal unit and the other end of the battery case is controlled when fixing the terminal unit with the battery case. The battery pack thus has a simple and low cost configuration and yet exhibits high reliability in terms of the connection state of the external connection terminals when set in a portable electronic device.

15 Claims, 6 Drawing Sheets

U.S. PATENT DOCUMENTS

| | | |
|---|---|---|
| 6,936,374 B2 * | 8/2005 | Ehara .................. 429/90 |
| 2003/0003357 A1 | 1/2003 | Tamai |
| 2003/0180582 A1 | 9/2003 | Masumoto |

FOREIGN PATENT DOCUMENTS

| | | |
|---|---|---|
| JP | 8-162078 | 6/1996 |
| JP | 2002-110121 | 4/2002 |
| JP | 2002-231201 | 8/2002 |
| JP | 2003-017022 | 1/2003 |
| JP | 2003-022789 | 1/2003 |
| JP | 2003-086159 | 3/2003 |
| JP | 2003-242947 | 8/2003 |

OTHER PUBLICATIONS

English Language Abstract of JP 2003-086159.
English Language Abstract of JP 2003-022789.
English Language Abstract of JP 2003-017022.
English Language Abstract of JP 2002-110121.
English Language Abstract of JP 8-162078.
U.S. Appl. No. 10/544,766 to Inoue et al., filed Aug. 8, 2005.

* cited by examiner

BATTERY PACK COMPRISING A BATTERY AND A TERMINAL UNIT

TECHNICAL FIELD

The present invention relates to a battery pack suitably used as a battery power source of portable electronic devices or the like, and more particularly to a battery pack having an enhanced external connectivity, and to its manufacturing method.

BACKGROUND ART

With the remarkable development of small, thin, and high-functionality portable electronic devices of the recent years, there is a growing demand for small, thin, and high-capacity batteries as the power source of these devices. Generally, lithium batteries can be structured small with a high capacity. In particular, flat prismatic lithium ion rechargeable batteries are suitable for the devices to be made thinner, and therefore they have been increasingly used as the rechargeable battery for portable electronic devices such as mobile phones.

There is known a battery pack used as a power source of various devices, including a battery and a circuit substrate provided with an overcurrent limiting means, a protection circuit against overcharge/overdischarge, and external connection terminals. The battery and the circuit substrate are placed in predetermined positions in an outer case having windows for exposing the external connection terminals, and configured as a battery pack. The circuit substrate is connected to connection terminals of the battery with leads (see, for example, Japanese Patent Laid-Open Publication No. 2002-231201).

There is also known a battery pack wherein a terminal substrate provided only with external connection terminals is used instead of the circuit substrate (see, for example, Japanese Patent Laid-Open Publication No. 6-333547).

Electronic devices are generally formed with a battery pack accommodating space in which the battery pack can snugly fit, and has a connection terminal that makes resilient contact with the external connection terminals on the same surface of the battery pack when the battery pack is accommodated for electrical connection therewith.

One example of the configuration of such a battery pack in which a circuit substrate or terminal substrate having external connection terminals is retained in the outer case is described with reference to FIG. 7A and FIG. 7B. Reference numeral 51 denotes a flat prismatic battery pack comprising a battery 32 structured as a lithium ion rechargeable battery and a circuit substrate 33 or a terminal substrate accommodated in an outer case 34 that is divided in two in a thickness direction. The circuit substrate 33 is connected to connection terminals 35a and 35b of the battery 32 with leads 36.

The battery 32 is formed of elements for electromotive force 38 encased in a battery case 37 having an open end sealed with a sealing member 39, which is formed with a protruding connection terminal 35a of one polarity, with an insulating gasket 40 interposed therebetween. The battery case 37 serves as the connection terminal 35b of the other polarity. The outer case 34 has windows 42 in one end wall 41 for exposing the external connection terminals provided on the circuit substrate 33, and an engaging projection 44 for holding the circuit substrate 33 such as to make contact with the inner surface of the end wall 41.

When the battery pack 51 shown in FIG. 7A and FIG. 7B is inserted in the battery pack accommodating space of a portable electronic device, a connection terminal makes contact with the external connection terminals with appropriate resiliency to establish electrical connection. However, since the circuit substrate 33 or terminal substrate provided with the external connection terminals is arranged such as to make contact with the end wall 41 of the outer case 34, the position of the external connection terminals varies depending on errors in the height H of the outer case 34. As the outer case 34 is a resin molded component and has a large height H, the errors tend to be large. Accordingly, there is a problem that sufficient reliability is hard to achieve in terms of the contact state between the external connection terminals of the battery pack 51 and the connection terminal in the battery pack accommodating space.

A possible solution for controlling the errors in the height of the battery pack within a predetermined range is to form the battery 32 and other components integrally by mold forming. However, the mold forming has several drawbacks such as poor productivity, high facility cost, and a potential large profit loss due to defective products resulting from possible molding troubles.

In view of the problems in the conventional technique described above, it is an object of the present invention to provide a battery pack that is highly reliable in respect of the contact state of its external connection terminals when set in a portable electronic device, a battery pack that has a simple and low-cost configuration and yet minimizes battery damage due to drop impact, and a manufacturing method of this battery pack.

DISCLOSURE OF THE INVENTION

To achieve the above object, a battery pack according to the present invention includes a battery in which a battery case and a cap of a sealing plate sealing an open end of the battery case serve as connection electrodes of opposite polarities, a terminal unit including external connection terminals respectively connected to these connection electrodes and an insulating cover integrally formed therewith, the terminal unit covering at least one end of the battery case, and a resilient member interposed between one end of the battery case and the terminal unit in a compressed state.

With this configuration, the terminal unit and the battery case are fixed while the dimension between the terminal unit and the other end of the battery case is controlled. The battery pack therefore exhibits high reliability in terms of the connection state of the external connection terminals when set in the portable electronic device. Because of the configuration wherein the insulating cover of the terminal unit covers one end of the battery case, the battery pack configuration is simplified and its cost is reduced. Moreover, the resilient member interposed between the terminal unit and the battery case allows easy and precise dimension control noted above by pressure adjustment. The resilient member also serves as a shock absorber when a large drop impact or the like is applied to the terminal unit, and prevents electrolyte leakage and deformation of the battery by protecting the sealed part of the battery against damage due to the impact.

With the dimension between the end face of the terminal unit and the other end of the battery case being controlled, electrical connection between the connection electrodes and the external connection terminals of the terminal unit, and fixation of the battery case with the terminal unit are readily achieved. The manufacturing process is thus simplified and productivity is improved.

One of the external connection terminals should preferably have a connection leg extending from the terminal unit such as to overlap part of the outer surface of one end of the battery case and being connected to the outer surface of the battery case by welding, so that reliable electrical connection and fixation are achieved with good productivity by the welding of the connection leg of the external connection terminal with the outer surface of one end of the battery case. As the battery is welded with the terminal unit having the external connection terminals integrated with the insulating cover, the battery pack will not be disassembled to take out the battery and misuse of the battery is prevented. For the welding process, any of resistance welding, laser beam welding, electron beam welding or the like is suitably applied.

At least one gas outlet aperture should preferably be provided in the connection leg in a given location within a height range of from the position at which it is welded to the outer surface of the battery case and the position corresponding to the lower end of the terminal unit, or in the vicinity of the boundary between the battery case and the lower end of the terminal unit, so that a discharge path is formed for letting out gas generated in the event of abnormality in the battery to the outside of the battery pack, for enhanced safety of the battery pack.

The other one of the external connection terminals and the cap should preferably be connected to each other via a lead plate that is placed inside the terminal unit, so that they are connected easily and reliably, and that the connected part therebetween is protected by the terminal unit.

Furthermore, a PTC element or a temperature fuse may be provided in the lead plate, so as to obtain high safety features of the battery pack simply, compactly, and at low cost.

Further, it is preferable in terms of simplification and cost reduction of the battery pack, if one of the external connection terminals includes a layer having a different resistance from that of the external connection terminal, or a skin coating having a predetermined resistance on part of its surface, so that the external connection terminal has an identification terminal portion without having to use a special circuit substrate or a terminal substrate mounted with a resistance element.

Further, at least part of the terminal unit and the outer surface of the battery case may be covered by a film-like outer material. A simple and low cost outer configuration for the battery pack is thereby achieved, with only the terminal unit and the film-like outer material.

BEST MODE FOR CARRYING OUT THE INVENTION

One embodiment of the battery pack and its manufacturing method of the present invention will be described below with reference to FIG. 1A to FIG. 6.

Figure 1B:
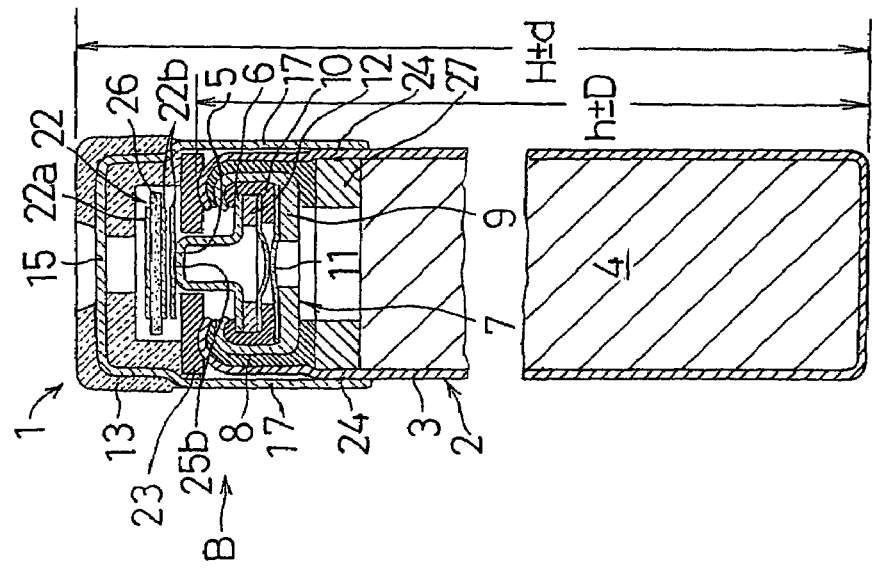
FIG. 1A is a perspective view and FIG. 1B is a schematic longitudinal cross-sectional view taken along the line IB-IB of FIG. 1A, illustrating one embodiment of a battery pack according to the present invention.
Figure 1A:
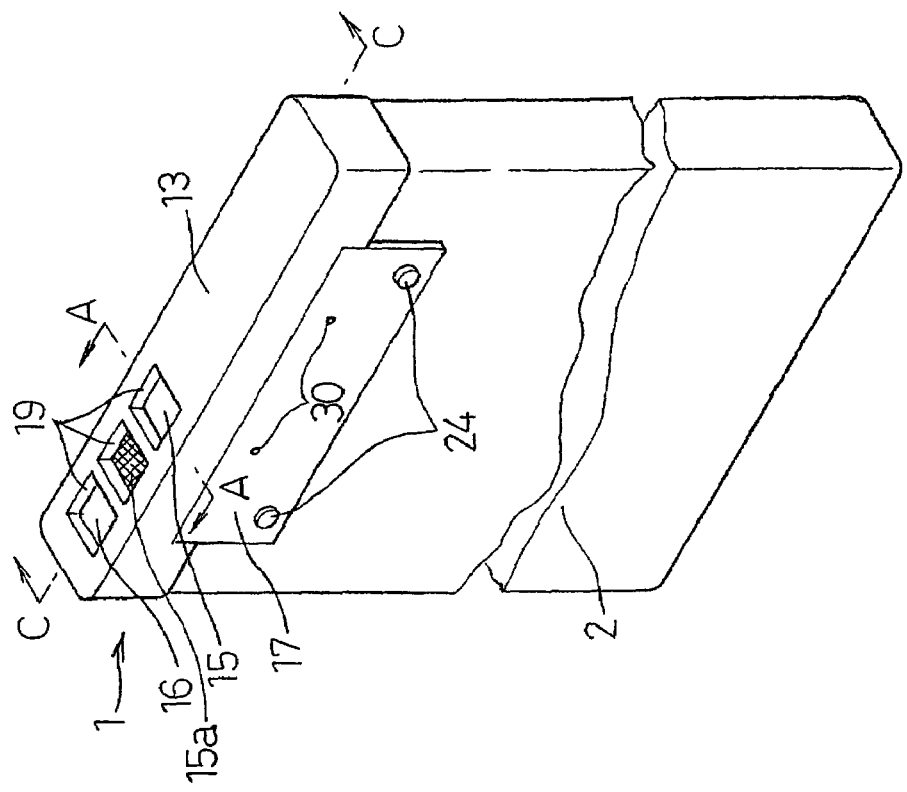
Figure 2:
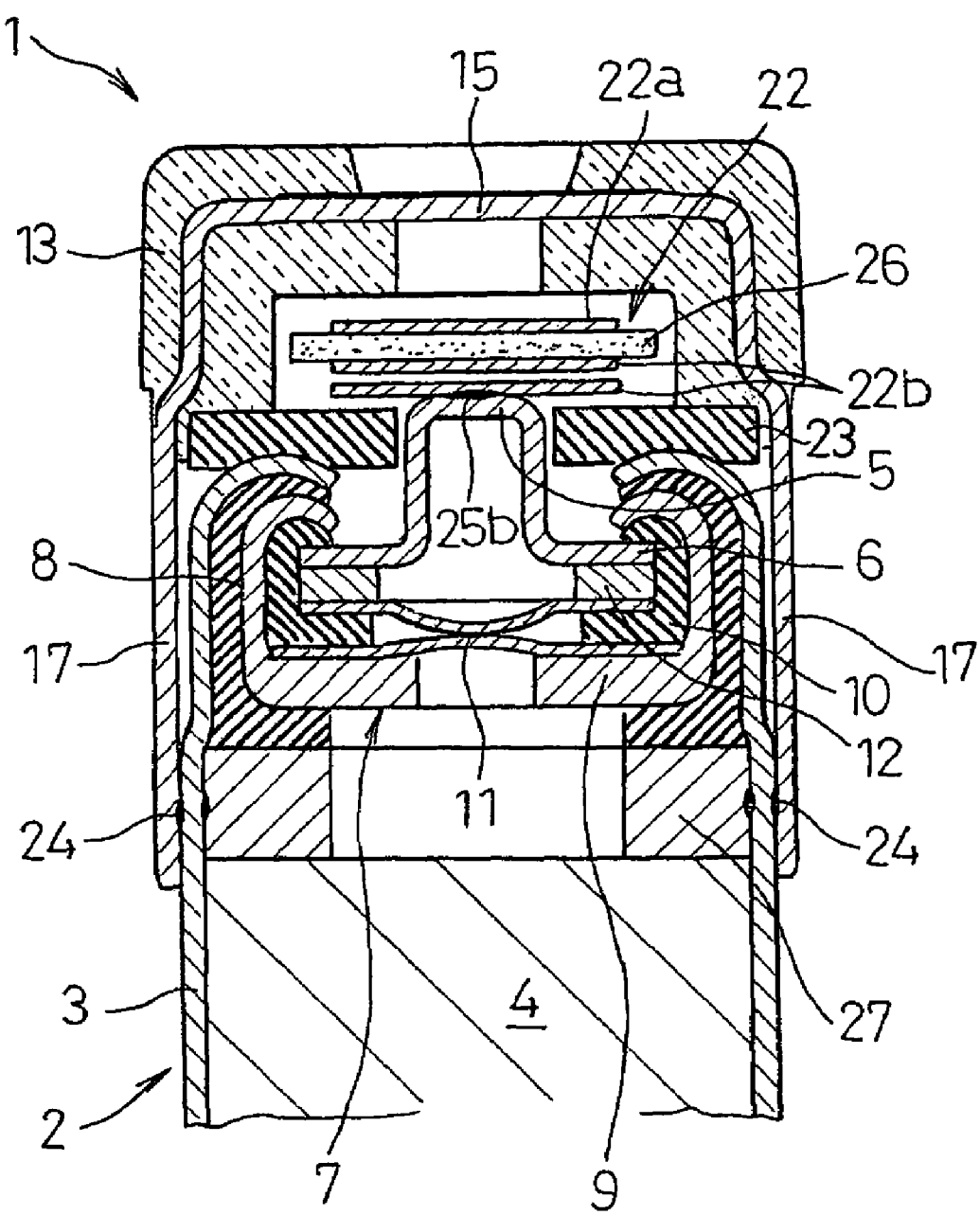
FIG. 2 is a detailed cross-sectional view enlarging part II of FIG. 1B to a larger scale.

Referring to FIG. 1A and FIG. 1B, the flat prismatic battery pack 1 has a battery 2 structured as a lithium ion rechargeable battery. As shown in FIG. 2, the battery 2 is formed of elements for electromotive force 4 consisting of laminated positive and negative electrodes with separators interposed therebetween and liquid electrolyte, these elements being encased in a battery case 3. The open end of the battery case 3 is sealed by a sealing plate 7 having a cap 6 with a protruded part 5 and an insulating gasket 8, the cap 6 serving as a connection electrode of one polarity, and the battery case 3 serving as a connection electrode of the other polarity. The sealing plate 7 is formed of a filter 9 and a safety vent mechanism 11, a PTC element 12, and the cap 6 accommodated in the filter 9, with an inner gasket 10 being interposed therebetween. The filter 9 is connected to the elements for electromotive force 4, and to the cap 6 via the safety vent mechanism 11 and the PTC element 12.

Figure 3:
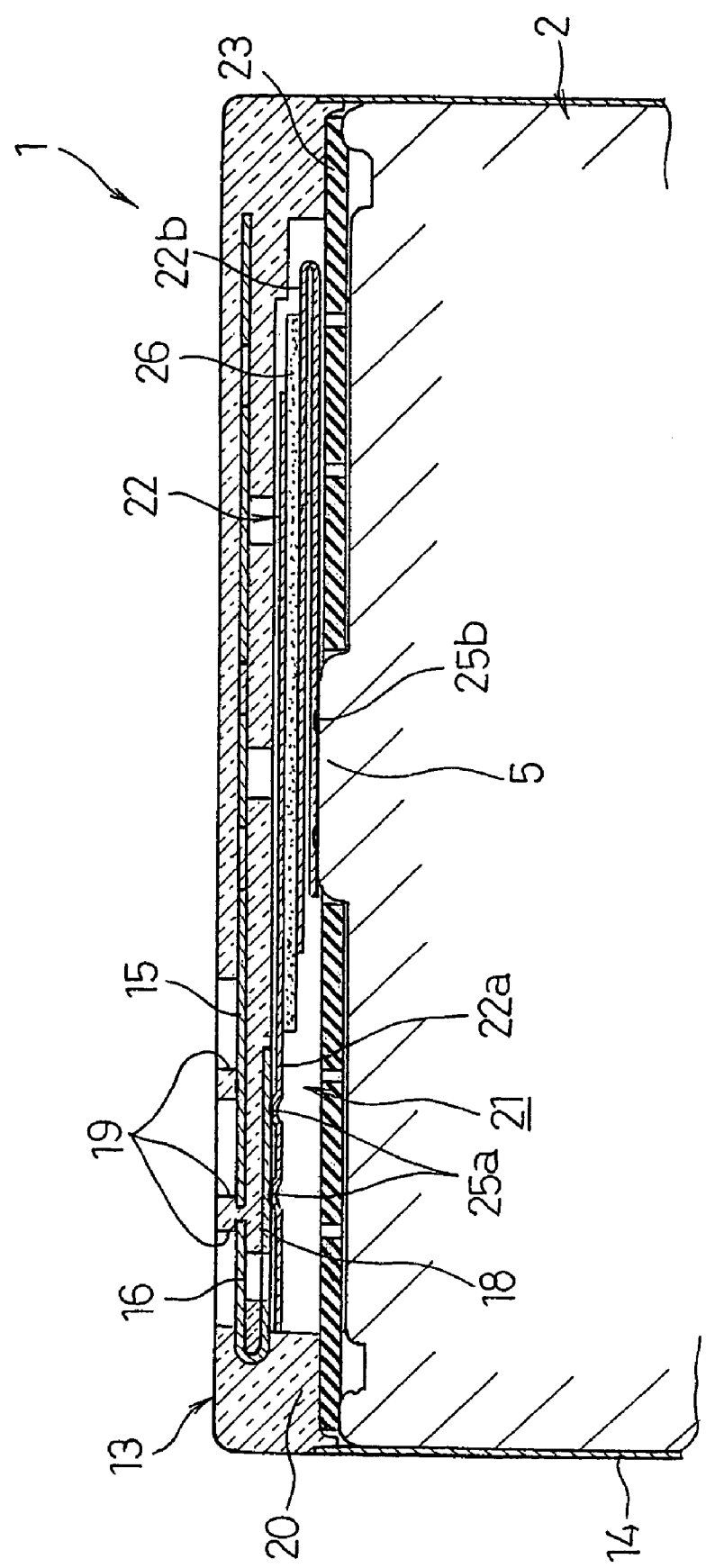
FIG. 3 is an enlarged cross-sectional view taken along the line III-III of FIG. 1A.
Figure 4:
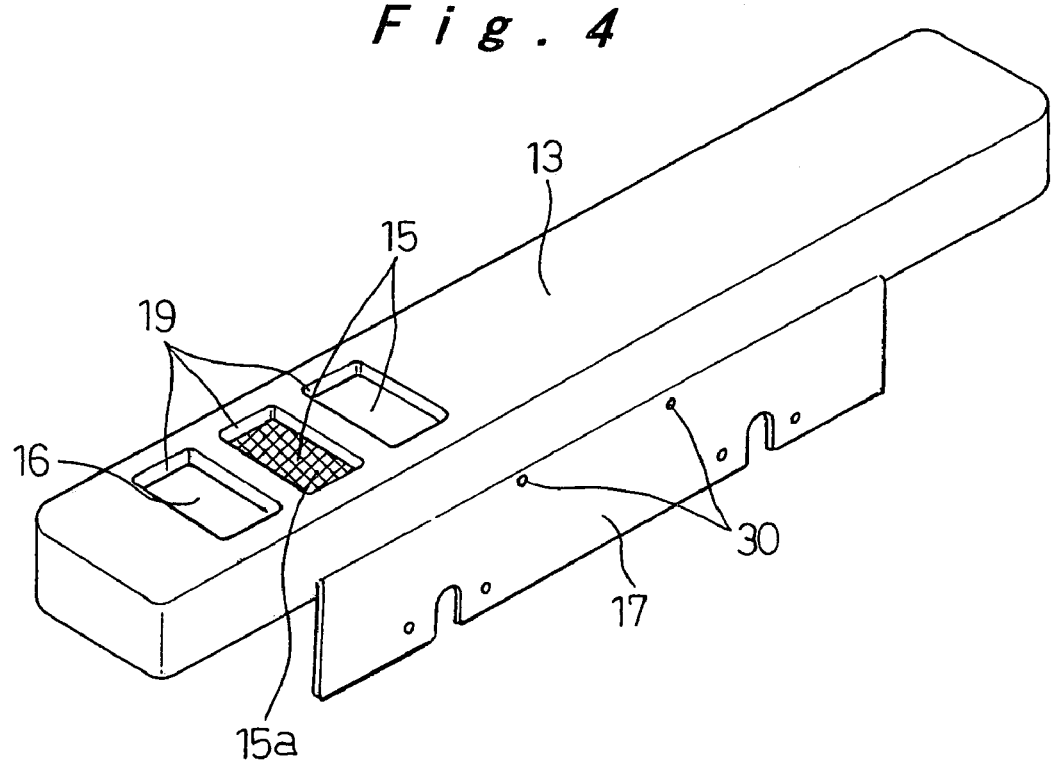
FIG. 4 is a perspective view showing the outer appearance of a terminal unit of the same embodiment of the battery pack.
Figure 5:
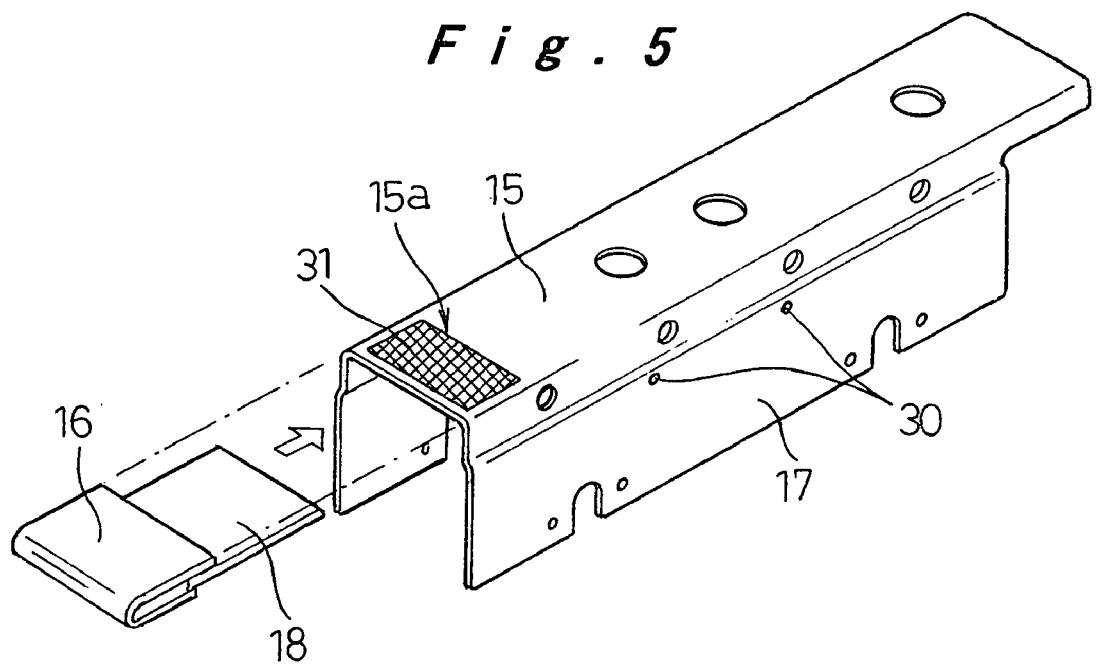
FIG. 5 is an exploded perspective view of an external connection terminal of the same embodiment of the battery pack.

Referring to FIG. 1A to FIG. 3, one end of the battery 2 is covered by a terminal unit 13. As shown in FIG. 3, a lower part of the terminal unit 13 and the outer surface of the battery case 3 are covered by a film-like outer material 14 to form the battery pack 1.

As shown in FIG. 1A to FIG. 5, the terminal unit 13 is formed of an insulating cover made of insulating resin and a first external connection terminal 15 and a second external connection terminal 16 integrated with the cover by insert molding. The first external connection terminal 15 has a generally square C-shape cross section, both of its connection legs 17 extending downwards from the terminal unit 13 to overlap the outer surface at one end of the battery case 3. The second external connection terminal 16 is bent back in U-shape in a lateral direction at one side end. A connection piece 18 extends from the second external connection terminal and enters into the first external connection terminal 15 with a space therebetween. The lower face of the connection piece 18 faces the lower face of the terminal unit 13.

A skin coating 31 is provided on part of the surface of the first external connection terminal 15 to define an identification terminal portion 15a that has a different resistance from that of the first external connection terminal 15.

In the end face of the terminal unit 13, opened windows 19 for exposing the first and second external connection terminals 15 and 16 and the identification terminal portion 15a are provided. An annular projection 20 protrudes from the lower circumference of the terminal unit 13 to form a space 21 for accommodating a lead plate 22 therein. Between the annular projection 20 and the crimped part at the open end of the battery case 3 is interposed a resilient member 23. The resilient member 23 is preferably made of polyethylene foam or butyl rubber having resistance to liquid electrolyte.

Figure 6:
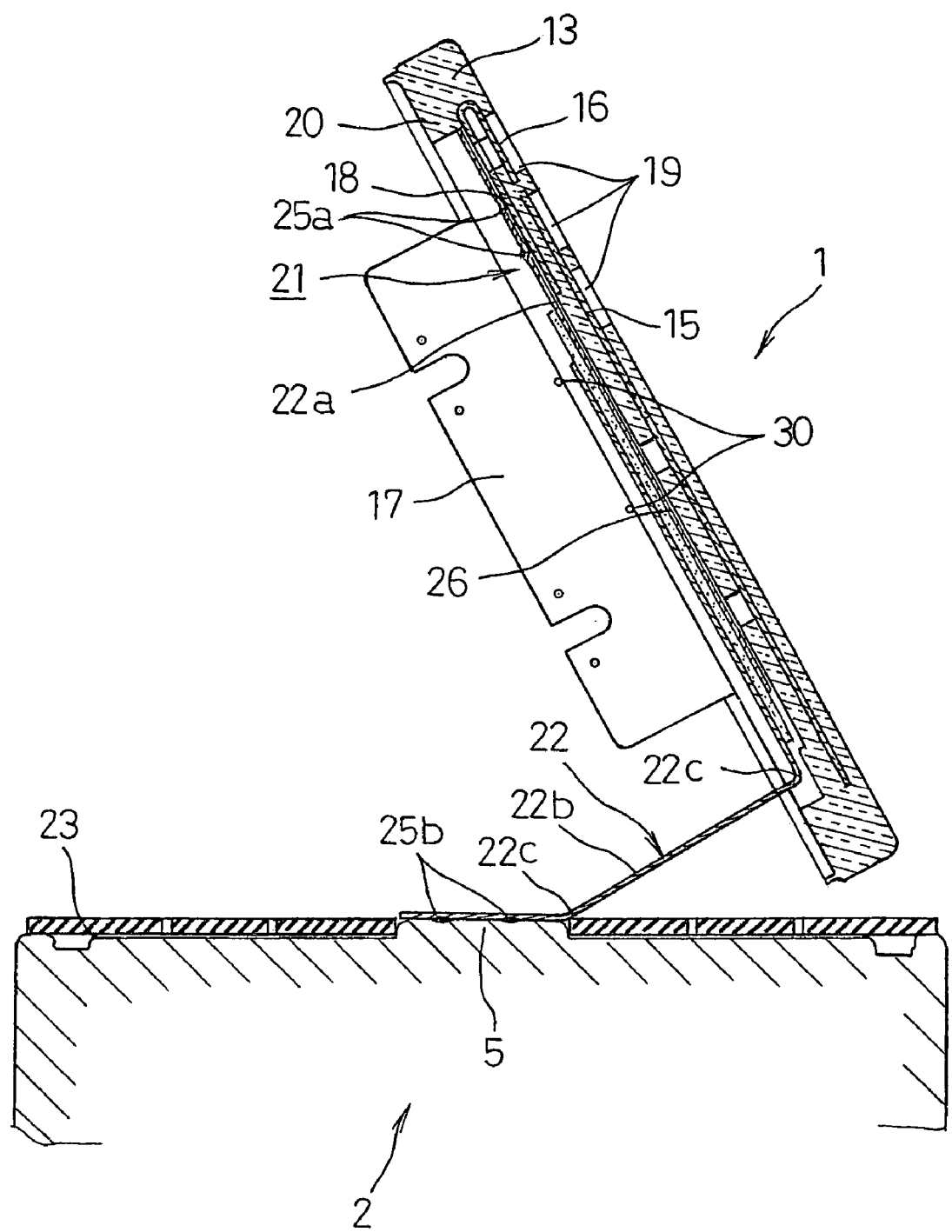
FIG. 6 is a longitudinal cross-sectional view illustrating a connection state between a lead plate and a protruded part of a cap in the same embodiment of the battery pack.
Figure 7A:
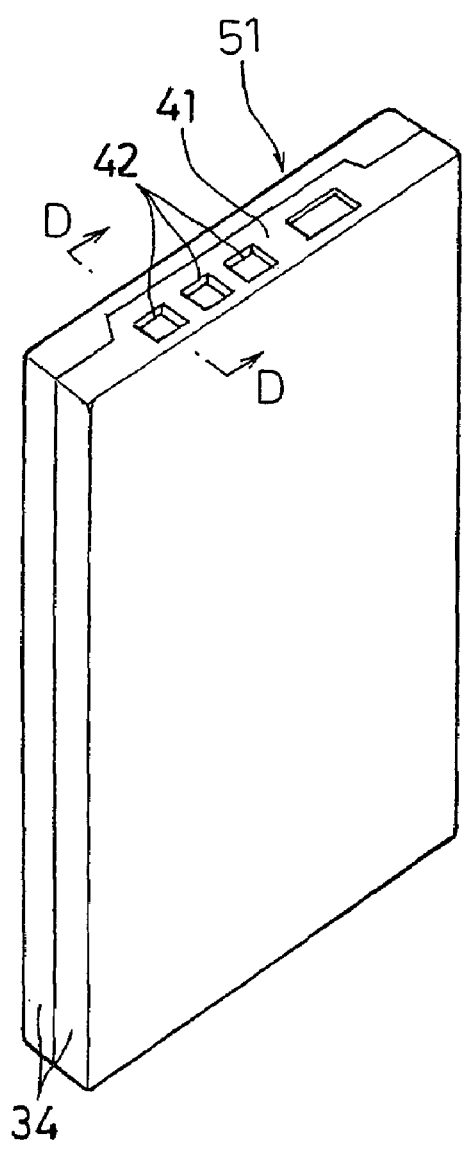
FIG. 7A is a perspective view and FIG. 7B is an enlarged cross-sectional view taken along the line VII-VII of FIG. 7A, illustrating a conventional battery pack.
Figure 7B:
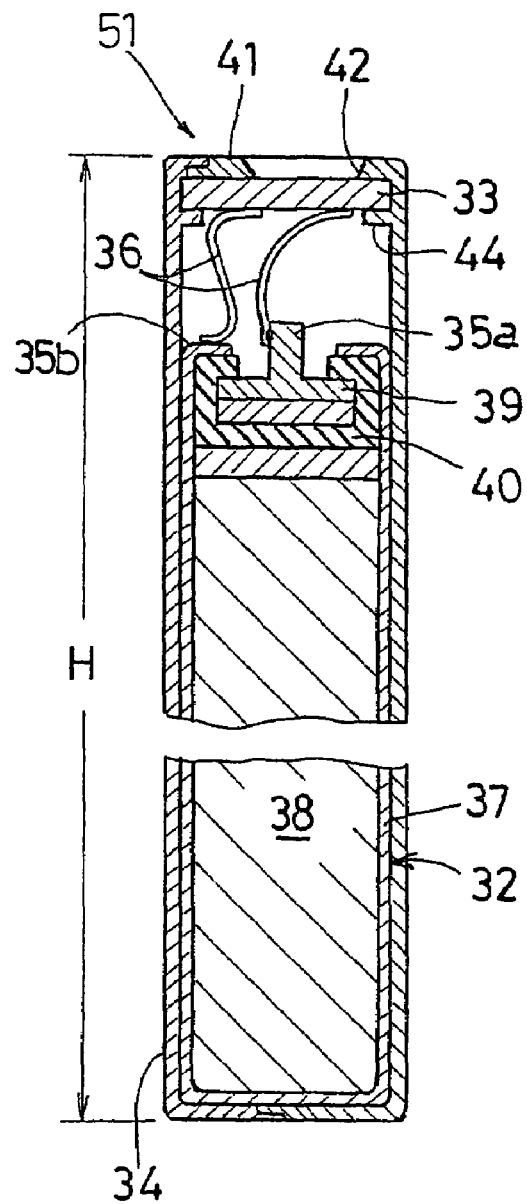

The connection legs 17 of the first external connection terminal 15 are connected to the outer surface of the battery case 3 at welds 24. The welds 24 connecting the connection legs 17 and the battery case 3 are located at the position where a reinforcing plate 27 is placed at one end of the battery case 3, as shown in FIG. 2. One end of the lead plate 22 is connected to the connection piece 18 of the second external connection terminal 16 at welds 25a, while the other end of the lead plate 22 is connected to the protruded part 5 of the cap 6 of the sealing plate at welds 25b. Referring to FIG. 2, FIG. 3, and FIG. 6, the lead plate 22 consists of a first lead plate 22a, a second lead plate 22b, and a PTC element 26 interposed therebetween, and has a function of shutting off electric current by drastically increasing the resistance when the temperature exceeds a predetermined limit. The second lead plate 22b is formed with bent portions 22c as shown in FIG. 6 in appropriate locations so as to enable smooth folding during the production and to enhance work efficiency.

As shown in FIG. 1A and FIG. 4 to FIG. 6, the connection legs 17 are provided with gas outlet apertures 30. In the event of generation and leakage of gas from the sealed part of the battery case 3 due to abnormal use or the like of the battery 2, these gas outlet apertures 30 let out the gas from the battery pack 1 to reduce the pressure inside and prevent a burst of the battery pack, whereby accidents such as breakage of the electronic device or injury of the user are prevented. The gas outlet apertures 30 are provided at given locations of the connection legs 17 within a height range of from the welds 24 between the connection legs 17 and the outer surface of the battery case 3 and the position corresponding to the lower end of the terminal unit 13.

Most preferably, the gas outlet apertures 30 should be provided in the connection legs 17 in the vicinity of the boundary between the battery case 3 and the lower end of the terminal unit 13. Smooth gas exhaustion is achieved by providing the gas outlet apertures 30 at such a position, as the high pressure gas leaking from the sealed part of the battery 2 is discharged to the outside of the battery pack 1 through the battery case 3 and the resilient member 23 via a shortest possible path.

While two gas outlet apertures 30 are provided on one side of the battery pack 1 in this embodiment, other configurations are possible as long as there is at least one gas outlet aperture 30. One gas outlet aperture 30 may be provided on one side of the battery pack 1, or, one aperture may be provided each on both sides of the battery pack 1.

Next, the manufacturing process of the battery pack 1 having such a configuration will be described. The battery 2, the terminal unit 13 integrating the first and second external connection terminals 15 and 16 with the insulating cover by insert molding, the lead plate 22, and the resilient member 23 are each individually produced. A mass production system for the battery 2 has been well established, and as other components are all simply designed, these are produced with good productivity.

Referring to FIG. 6, first, one end of the lead plate 22 is attached to the connection piece 18 of the terminal unit 13 at welds 25a, and after placing the resilient member 23 at one end of the battery 2, the other end of the lead plate 22 is connected to the protruded part 5 of the battery 2 at welds 25b.

Next, the terminal unit 13 is covered on one end of the battery 2, such that the height H between the other end of the battery 2 and the end face of the terminal unit 13 shown in FIG. 1B is restricted within a predetermined tolerance of ±d. This height control is readily achieved by adjusting the compression rate of the resilient member 23 when pressure is applied from the other end of the battery 2 and the end face of the terminal unit 13. For this purpose, the thickness of the resilient member 23 should preferably be larger than the doubled value of the tolerance ±D of the height h of the battery case 3 of the battery 2. More specifically, D is preferably about 0.2 mm, and d is less than 0.15 mm.

With the height H of the battery pack 1 being controlled within a predetermined tolerance of ±d, the connection legs 17 are welded at welds 24 to the outer surface at one end of the battery case 3, to connect the first external connection terminal 15 with the one end of the battery case 3, as well as to fix the terminal unit 13 on the battery case 3. Preferably, the welding should be performed at the position where the reinforcing plate 27 is located at one end of the battery case 3, so that reliable welding is achieved with good productivity even though the battery case 3 is thin. After that, part of the terminal unit 13 and the outer surface of the battery case 3 are covered by the film-like outer material 14 as shown in FIG. 3, to complete the battery pack 1.

With the battery pack 1 having the above configuration, because the terminal unit 13 and the battery case 3 are fixed to each other with the height H between the end face of the terminal unit 13 and the other end of the battery case 3 being restricted within a predetermined permissible tolerance of ±d, the connection state of the external connection terminals 15 and 16 is highly reliable when the battery pack is set in the portable electronic device.

As the first external connection terminal 15 has the connection legs 17 extending from the terminal unit 13 such as to overlap the outer surface of one end of the battery case 3 and being connected at welds 24 to the outer surface of the battery case 3, electrical connection and fixing of the terminal unit 13 and battery case 3 are achieved at the same time. As the welds 24 provide highly reliable connection and fixation, the manufacturing process is simplified and the productivity is improved.

One end of the battery case 3 is covered by the terminal unit 13, and part of the terminal unit 13 and the outer surface of the battery case 3 are covered by the film-like outer material 14. This simple outer structure enables low cost configuration of the battery pack 1.

The resilient member 23 interposed between the terminal unit 13 and the battery case 3 in a compressed state allows easy and precise dimension control noted above by pressure adjustment, which ensures high productivity. The resilient member 23 also serves as a shock absorber when a large drop impact or the like is applied to the terminal unit 13, and prevents electrolyte leakage and deformation of the battery by protecting the sealed part of the battery 2 against damage due to the impact.

As the first external connection terminal 15 is integrally formed with the insulating cover of the terminal unit 13 and welded to the battery case 3 of the battery 2, the battery pack 1 will not be disassembled to take out the battery 2, and misuse of the battery 2 is prevented.

The second external connection terminal 16 and the protruded part 5 of the cap 6 of the sealing plate are connected to each other via the lead plate 22 that is placed in the space 21 inside the terminal unit 13. Therefore, the second external connection terminal 16 is connected to the protruded part 5 of the cap 6 easily and reliably, and the connected part is suitably protected by the terminal unit 13. Furthermore, the PTC element 26 is provided in the lead plate 22. The battery pack 1 with high safety features is thus obtained simply, compactly, and at low cost.

Prior to the integration process by insert molding, the first external connection terminal 15 is provided with the identification terminal portion 15a that has a higher resistance than the first external connection terminal 15. The identification terminal portion 15a is formed by printing and baking a paste on part of the surface of the first external connection terminal 15. The paste includes a conductive agent such as carbon black, graphite or the like, resin such as epoxy resin, phenol resin or the like, inorganic filler such as silica, mica, talc or the like, and, depending on needs, a hardening agent, all of which are admixed and dispersed in a solution. As there is no need of mounting a resistance element on the circuit substrate or terminal substrate to form the identification terminal portion 15a, the configuration of the battery pack 1 is made simple and low cost. The identification terminal portion 15a may be formed by providing a skin coating 31 that has a higher resistance than the first external connection terminal 15 on part of the surface of the first external connection terminal 15.

While the PTC element 26 is provided in the lead plate 22 in the embodiment described in the foregoing, a temperature fuse may be provided instead of the PTC element 26. Alternatively, the lead plate 22 may not include such a safety function. The connection configuration using the lead plate 22 for connecting the protruded part 5 of the cap 6 and the second external connection terminal 16 is not a requirement. For example, the second external connection terminal 16 may be formed with a connection piece that makes contact with a side face of the protruded part 5, and this connection piece may be connected to the protruded part 5 by welding through an opening formed in the terminal unit.

INDUSTRIAL APPLICABILITY

As described above, according to the battery pack and its manufacturing method of the present invention, the external connection terminals connected to the connection electrodes of the battery and the insulating cover are integrated to form a terminal unit, and the dimension between this terminal unit and the other end of the battery is controlled when fixing the terminal unit and the battery case. The battery pack thus exhibits high reliability in terms of the connection state of the external connection terminals when set in the portable electronic device. The configuration in which one end of the battery case is covered by the terminal unit enables simplification and cost reduction of the battery pack. The resilient member interposed between the terminal unit and the battery case in a compressed state is suitable for easy and precise dimension control noted above by pressure adjustment. In addition, the resilient member serves as a shock absorber when a large drop impact or the like is applied to the terminal unit, and is suitable for preventing electrolyte leakage and deformation of the battery by protecting the sealed part of the battery against damage due to the impact.

The invention claimed is:

1. A battery pack comprising:
   a battery in which a battery case and a cap of a sealing plate sealing an open end of the battery case serve as connection electrodes of opposite polarities;
   a terminal unit including external connection terminals respectively connected to the connection electrodes and an insulating cover integrally formed with the terminal unit, the terminal unit covering at least one end of the battery case;
   a resilient member interposed between the at least one end of the battery case and the terminal unit in a compressed state; and
   one of the external connection terminals of the terminal unit includes at least one selected from the group consisting of a layer having a different resistance from that of the external connection terminal on part of a surface of the external connection terminal and a skin coating having a predetermined resistance on part of a surface of the external connection terminal.

2. The battery pack according to claim 1, wherein with the dimension between the end face of the terminal unit and the other end of the battery case being controlled, the connection electrodes and the external connection terminals are connected with one another to fix the battery case with the terminal unit.

3. The battery pack according to claim 1, wherein one of the external connection terminals has a connection leg extending from the terminal unit such as to overlap part of the outer surface of one end of the battery case and being connected to the outer surface of the battery case by welding.

4. The battery pack according to claim 3, wherein at least one gas outlet aperture is provided in the connection leg in a given location within a height range of from a welding position at which it is welded to the outer surface of the battery case and a position corresponding to the lower end of the terminal unit.

5. The battery pack according to claim 3, wherein at least one gas outlet aperture is provided in the connection leg in the vicinity of the boundary between the battery case and the lower end of the terminal unit.

6. The battery pack according to claim 3, wherein the other one of the external connection terminals and the cap are connected to each other via a lead plate that is placed inside the terminal unit.

7. The battery pack according to claim 6, wherein a PTC element or a temperature fuse is provided in the lead plate.

8. The battery pack according to claim 1, wherein one of the external connection terminals includes a layer having a different resistance from that of the external connection terminal on part of the surface of the external connection terminal, and the terminal unit is integrated with the insulating cover after forming an identification terminal portion.

9. The battery pack according to claim 1, wherein one of the external connection terminals is provided with a skin coating having a predetermined resistance on part of the surface of the external connection terminal, and the terminal unit is integrated with the insulating cover after forming an identification terminal portion.

10. The battery pack according to claim 1, wherein at least part of the terminal unit and the outer surface of the battery case are covered by a film-like outer material.

11. A battery pack comprising:
    a battery in which a battery case and a cap of a sealing plate sealing an open end of the battery case serve as connection electrodes of opposite polarities;
    a terminal unit including external connection terminals respectively connected to these connection electrodes and an insulating cover integrally formed with the terminal unit, the terminal unit covering at least one end of the battery case; and
    a resilient member interposed between one end of the battery case and the terminal unit in a compressed state;
    wherein one of the external connection terminals has a connection leg extending from the terminal unit such as to overlap part of the outer surface of one end of the battery case and being connected to the outer surface of the battery case by welding.

12. The battery pack according to claim 11, wherein at least one gas outlet aperture is provided in the connection leg in a given location within a height range of from a welding position at which it is welded to the outer surface of the battery case and a position corresponding to the lower end of the terminal unit.

13. The battery pack according to claim 11, wherein at least one gas outlet aperture is provided in the connection leg in the vicinity of the boundary between the battery case and the lower end of the terminal unit.

14. The battery pack according to claim 11, wherein the other one of the external connection terminals and the cap are connected to each other via a lead plate that is placed inside the terminal unit.

15. The battery pack according to claim 14, wherein a PTC element or a temperature fuse is provided in the lead plate.

* * * * *